E. M. & E. W. COLE.
PLANTER.
APPLICATION FILED JUNE 27, 1916.

1,226,187. Patented May 15, 1917.

E. M. Cole and
E. W. Cole
Inventors,

Witnesses by C. A. Snow & Co.
Attorneys.

UNITED STATES PATENT OFFICE.

EUGENE MACON COLE AND ELISHA WORTH COLE, OF CHARLOTTE, NORTH CAROLINA.

PLANTER.

1,226,187. Specification of Letters Patent. Patented May 15, 1917.

Application filed June 27, 1916. Serial No. 106,196.

*To all whom it may concern:*

Be it known that we, EUGENE MACON COLE and ELISHA WORTH COLE, citizens of the United States, residing at Charlotte, in the county of Mecklenburg, State of North Carolina, have invented a new and useful Planter, of which the following is a specification.

This invention relates to planters and more particularly to machines for planting cotton seeds.

Owing to unexpected changeable climatic conditions, it is often impossible with planters heretofore used to produce a healthy germination and growth of plants and considerable losses are thus occasioned through poor stands of plants. For example, should seeds be planted at one depth in anticipation of a wet season, and a dry season should result, the desired stands of plants would not be obtained and the same is likewise true should the seeds be planted in expectation of a dry season but a long and rainy season should follow.

One of the objects of the present invention is to provide a planter which will deposit the seeds at different depths and close together so that those seeds which are best situated under the existing climatic conditions will produce the most sturdy plants and a good crop will thus be assured under all conditions of climate which may arise after the planting has been effected.

A further object is to provide planting mechanism which is simple in construction and will operate efficiently to plant the seeds regularly at different depths so that all seeds at corresponding depths will be regularly spaced.

Another object is to provide planting mechanism which can be adjusted readily to vary the depth at which the seeds are planted.

A further object is to provide means for pressing seeds firmly into close contact with the soil, thus facilitating the absorption of moisture and causing quick germination of the seeds.

Another object is to provide a furrow opener that will make a furrow composed of a series of uniform depressions, each depression varying from a minimum to a maximum depth, the seeds to be deposited in front of the furrow opener and pressed into the soil thereby or, if preferred, the seeds may be deposited behind the furrow maker in the series of depressions.

A still further object is to provide means for pressing seeds into the soil to any uniform depth, where desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1:
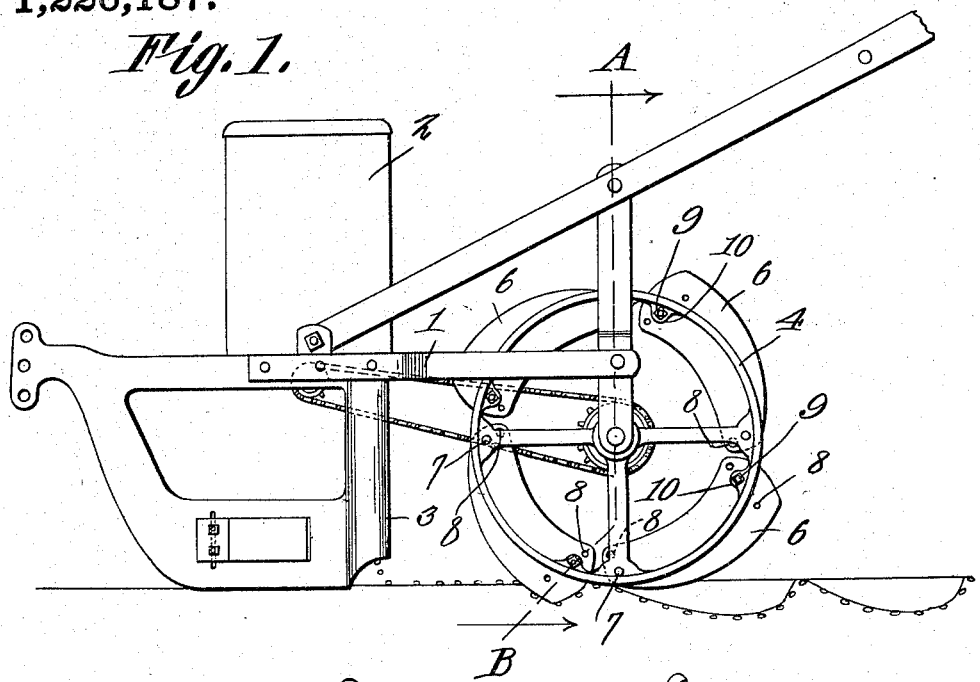
Figure 1 is a side elevation of a planter embodying the present improvements.
Figure 2:
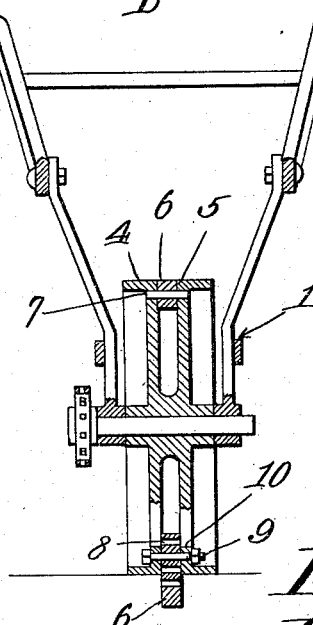
Fig. 2 is a section on line A—B Fig. 1.

Referring to the figures by characters of reference 1 designates a planter structure carrying a seed hopper 2 and an outlet boot 3 for depositing the seeds onto the ground. Journaled within the structure 1 and directly back of the boot 3 so as to travel over the row of seeds desposited from the boot, is a wheel 4 having a central annular channel 5 in which are mounted segmental shoes 6. Said shoes have approximately the same curvature as the wheels and are fitted close together. The shoes may be of different forms to make furrows of various shapes. Each shoe is pivotally mounted at one end, as shown at 7 and may be provided at each end with a series of apertures 8. A bolt 9 is extended transversely through the wheel and through the apertures 8 remote from the pivot 7. Spaced ears 10 are provided within the wheel for holding each bolt 9. By providing a series of apertures in each end of each of the shoes, both ends can be adjusted outwardly from the periphery of the wheel so that the shoes will produce a furrow of substantially uniform depth or, if preferred, a single aperture may be provided at the front end of each shoe for the reception of the pivot 7, thus permitting the shoe to be projected beyond the periphery of the wheel any suitable distance, thus to produce a furrow of varying depth.

One person might, for example, prefer to have the shoes project the same distance at each end, say for example, two inches, another person might prefer to have the shoes project one inch at one end and two inches at the other end, while a third person might prefer to have them project only at one end beyond the periphery of the wheel. By providing a series of apertures at each end of each shoe and employing the removable bolts and pivots, these various adjustments can be easily effected.

Assuming that the shoes have been adjusted to produce furrows of varying depths, the machine is moved forwardly and the seeds are deposited in a row upon the ground directly in the path of the shoes. The wheel following the boot 3 will force the shoes into the ground and firmly embed the seeds in the ground. Where the shoes project only at their rear ends beyond the periphery of the wheel, such projections being, for example, two inches, it will be obvious that the depressions produced will range from 0 to two inches. After these depressions are filled with soil and covered, the planting operation is completed.

It will be apparent that by planting the seeds at different depths, the positions of certain of the seeds will be better suited to the climatic conditions subsequent to the planting than will be the positions of the remaining seeds and, as a result, those seeds which are best located will produce the most desirable plants while the other plants can be cut out in the usual manner. By having the various depressions duplicated, the corresponding seeds in the different depressions being regularly spaced apart, it will be seen that those plants which thrive the most will be regularly spaced after the other plants have been cut out of the rows.

By providing the apertures 8 and the bolts 9, the shoes 6 can be adjusted to produce depressions of any desired depth.

Instead of utilizing movable or adjustable shoes upon the wheel, said wheel may have one or more fixed projections on its periphery for pressing the seeds into the soil.

What is claimed is:—

1. In a planter, the combination with means for depositing a row of seeds upon the ground, of means for depressing the seeds to different depths below the surface of the ground.

2. In a planter, the combination with means for depositing a row of seeds upon the ground, of separate means for successively engaging the row of seeds to depress the seeds to different depths below the surface of the ground.

3. In a planter, the combination with means for depositing a row of seeds upon the ground, of means for moving along the row of seeds to form a series of depressions of varying depths.

4. In a planter, the combination with means for depositing a row of seeds upon the ground, of means for moving along the row of seeds to form a series of depressions of varying depths, said means being adjustable to produce depressions of different depths.

5. In a planter, the combination with means for depositing a row of seeds upon the ground, of a wheel mounted for rotation and movable along the row of deposited seeds, shoes pivotally mounted in the rim of the wheel and adjustable angularly relative thereto, and means for holding the shoes against movement relative to the wheel.

6. In a planter, the combination with means for depositing a row of seeds upon the ground, of means for making depressions in uniform lengths and of variable depths.

7. In a planter, the combination with means for depositing a row of seeds upon the ground, of means for pressing the seeds firmly into the soil to varying depths, in successive uniform spaces.

8. In a planter, the combination with means for depositing a row of seeds upon the ground, of spaced adjustable means for pressing the seeds into the soil.

In testimony that we claim the foregoing as our own, we have hereto affixed our signatures in the presence of two witnesses.

EUGENE MACON COLE.
ELISHA WORTH COLE.

Witnesses:
W. L. Dixon,
J. A. Williams.

Copies of this patent may be obtained for five cents each, by addressing the "Commissioner of Patents, Washington, D. C."